INVENTOR.
ROBERT HELMER

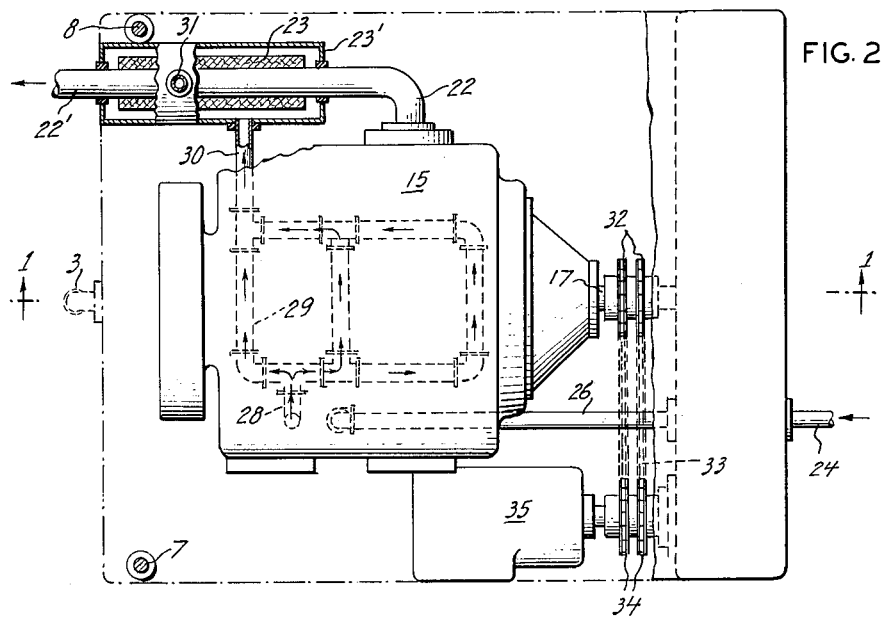
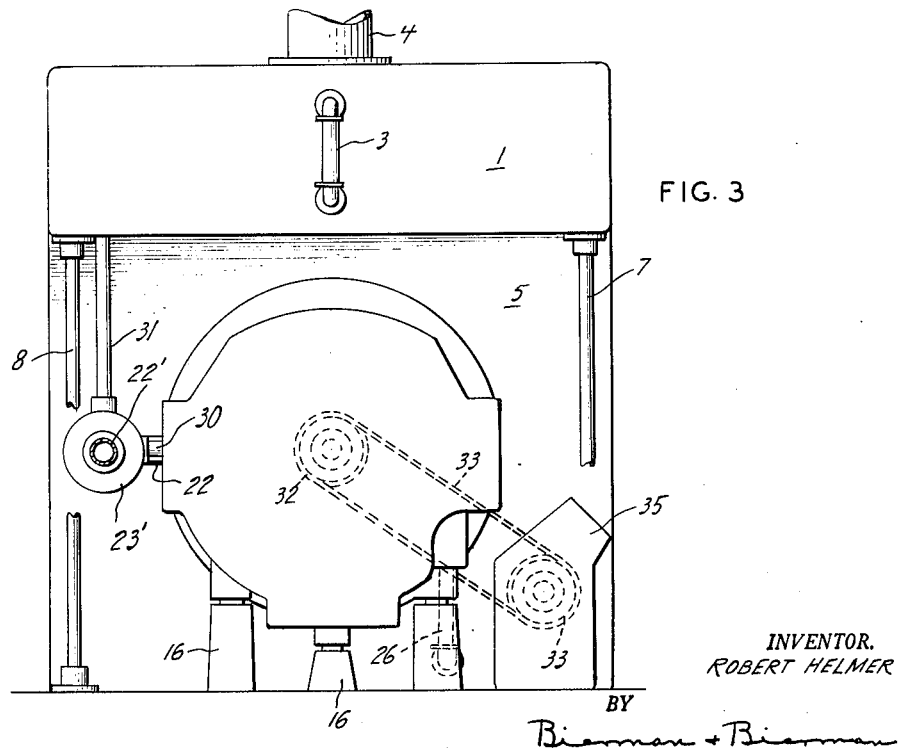

3,198,176
THERMAL-MOLECULAR HEATING SYSTEM
Robert Helmer, 27 Baker Hill Road, Great Neck, N.Y.
Filed Jan. 30, 1961, Ser. No. 85,801
8 Claims. (Cl. 122—26)

The present invention is directed to heating systems, and more particularly to a new and highly efficient means for converting the chemical energy in organic fuels into heat.

Up to the present time it was customary to burn the fuel, such as oil or gas, in a suitable boiler and to transfer the heat through the walls of the boiler to water, which was circulated through the area to be heated, or the water was transformed into steam which was then so circulated. The usual installation, be it a gas burner or an oil burner, depends on electric power, so that in case of power failures, it becomes inoperative.

In the average home installation only about 50%, or even less, of the heat energy of the oil or gas was available for the production of steam. This becomes readily obvious when one views the color of the flame. The fact that it is yellow shows that only partial combustion occurs; the balance goes past the boiler baffles and up the flue in the form of unburned or partially burned carbon. This unburned carbon is not only wasteful of the potential heat energy in the fuel, but it also causes a soot deposit on the boiler baffles, lowering the thermal conductivity of these baffles in conducting the heat of the flame and hot gases to the water to be heated.

It has also been proposed to heat water by mechanical means, such as by a friction element rotating against the wall of a boiler or the like. This required a motor driven by electric power. As a result the system became inoperative in case of power failure. Also, there was considerable wear induced in the contacting elements so that mechanical failure resulted. The system was uneconomical to operate as it required the use of electricity which was expensive and the conversion of the energy left much to be desired.

The present invention is intended and adapted to overcome the difficulties and disadvantages inherent in prior heating systems, it being among the objects thereof to provide a system in which fuel is burned with a substantially higher recovery of the heat produced than in prior systems.

It is also among the objects of the invention to provide a heating system embodying an internal combustion engine, and in which both the heat and mechanical energy are largely recovered in the form of usable heat.

It is further among the objects of the invention to devise a heating system which is self contained and which does not require an outside source of electricity for operation thereof.

The present system is applicable to a variety of uses, such as for domestic home heating, industrial heating, steam generation for processing plants, locomotion, and others.

It is a well known scientific fact that the vast oil resources on this earth obtained their potential heat energy from the sun, and since the beginning of time, man has sought to utilize these and other natural resources to serve his needs. Energy can be converted from one form to another, but not without loss. Indeed, it is impossible to convert energy from one single form to another single form for this would be a complete conversion without loss. Each conversion must, by necessity, have other by-products, and it is the purpose of this invention to extract the maximum amount of heat energy from oil or gas with the minimum of loss.

To practice this invention, the chemical energy of the fuel oil is converted into heat by using it to run a diesel or other internal combustion engine. Here it is exploded under pressure with the proper amount of air, thereby providing maximum efficiency of combustion. The by-products of this conversion is heat and mechanical energy.

As an example of the utilization of these by-products, let us take a standard diesel engine such as is manufactured by Fairbanks, Morse & Co. Their Model 45C3-⅛ is rated at 5¼ horsepower. It is a single cylinder engine with a rated capacity of 5¼ horsepower at 1800 r.p.m.; its fuel consumption is 0.34 gallon per hour.

The B.t.u. content of #2 fuel oil is 140,000 B.t.u. per gallon; therefore, the fuel consumed by this engine has a heat content of 47,600 B.t.u. The heat value of the mechanical output of this engine is $5.25 \times 2545 = 13,400$ B.t.u. The mechanical efficiency of the engine is then 13,400/47,600 or 28 percent.

The balance of 34,200 B.t.u. or 72 percent of the total input energy is the thermal loss encountered in running this engine. Practically all of this heat loss is recoverable, first by pumping the boiler water through the cylinder block directly back into the boiler and secondly by connecting the exhaust manifold to fire tubes which festoon through the boiler water. These fire tubes are kept large in cross section so the exhaust gas velocity is at a very low rate, causing sufficient dwell of the hot gases to insure the proper heat transfer to the water. These fire tubes also serve as a muffler.

The mechanical output of the engine is coupled to the rotor or magnetic flux generator of a hysteresis coupling, such as is described in applicant's Patent No. 2,603,678. The hysteresis ring member of the coupling is mounted rigidly in the boiler and is an integral part thereof. In this patent in FIG. 6 there is shown a set of two curves comparing the torque produced by the use of hysteresis and that produced by eddy currents in two identical machines. In the eddy current machine the torque decreased as the difference in speed (slip) between the input and output increased. But in the hysteresis machine the torque increased as the difference in speed between the input and output increased. In the prior eddy current machine the maximum torque came at about 250 r.p.m. and the torque was about 38 f./p. In the hysteresis machine at about 250 r.p.m. the torque was about 150 f./p. When the speed reached 1200 r.p.m., the output from the prior machine had decreased to about 22 f./p., while the output from the hysteresis machine had reached 550 f./p. and the rate of increase was very steep. At still higher speeds the output from the prior machine continues to drop, whereas from the hysteresis machine the output increases rapidly.

The hysteresis coupling is used in the present invention as a dynamometer to absorb the entire mechanical output of the diesel engine. The engine drives the flux generator; and the hysteresis ring, not being able to turn, converts the mechanical energy of the engine into heat through molecular friction in the steel ring. The ring is shrouded with copper radiating fins to conduct the heat to the water in the boiler. The excitation current for the coils in the flux generator requires approximately 56 watts.

The diesel engine is battery started and therefore not dependent upon local house current for its operation, thus providing heat even during power failure. The engine is started and stopped by the room thermostat. Coupled to the engine is a 3 kw. alternator, the field of which is disconnected from the excitation source by a relay which is held open by the house current. In the event of a power failure, the relay is released and the contacts close to excite the field of the alternator and open the circuit to the flux generator of the hysteresis coupling.

In addition to having a highly efficient home heating plant, this invention also provides stand-by power for refrigeration and lighting. In normal operation, the mechanical output of the engine is used to generate heat along with the 72% thermal loss of the engine, and during power failure the mechanical output of the engine is used to provide stand-by electrical power and the 72% thermal loss alone to provide the heating.

The invention is more fully described in connection with the accompanying drawing, constituting a part hereof, in which like reference characters indicate like parts, and in which FIG. 1 is a vertical longitudinal cross-sectional view of a combination made in accordance with the present invention, some parts being shown in elevation for clearness.

FIG. 2 is a top plan view thereof, and

FIG. 3 is an elevational view from the left in FIG. 1.

Figure 1:
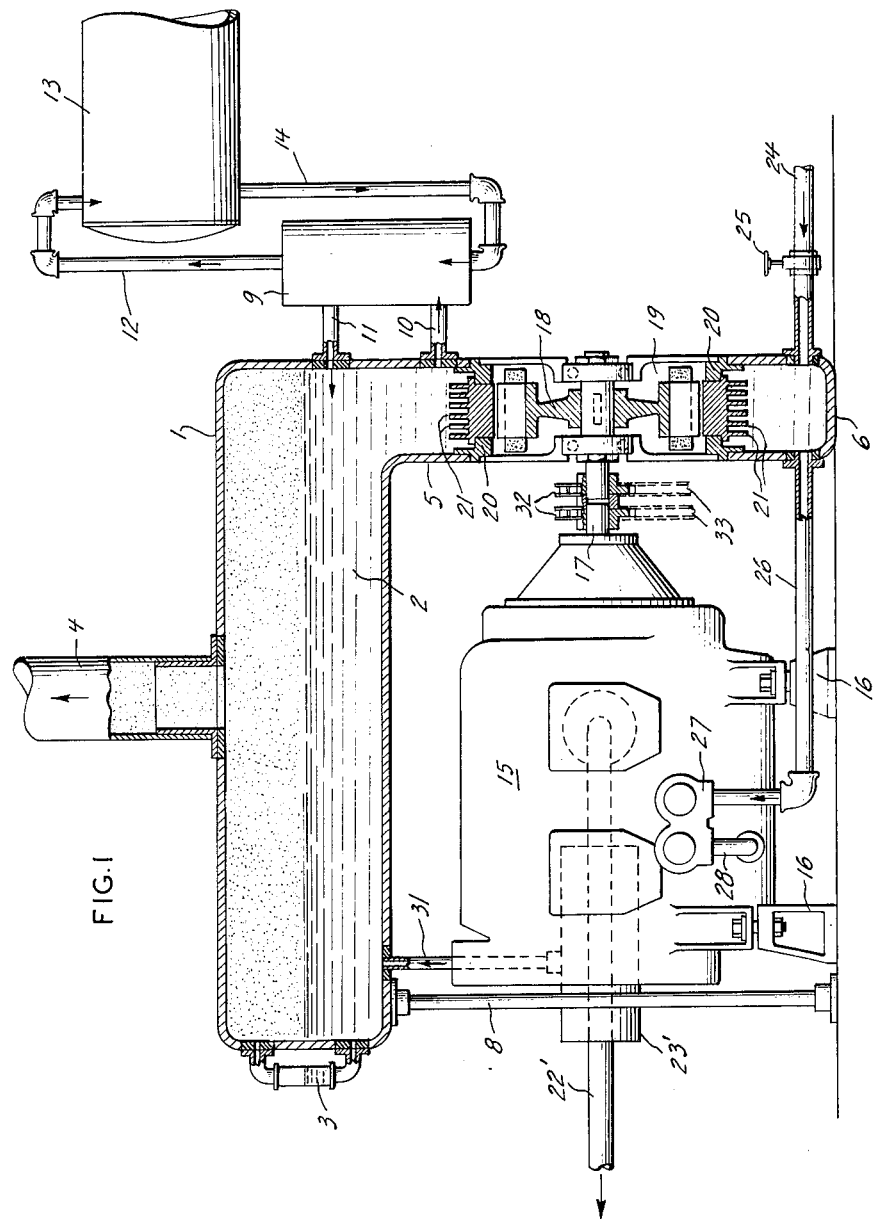

The apparatus consists of a horizontal boiler 1 which is filled with water 2 up to a desired level as shown by gauge glass 3. Steam pipe 4 allows steam from the boiler to be fed into the heating system. The boiler has a transverse portion 5 communicating with the main section and resting at 6 on a suitable base such as the floor 7 of a building. Legs 8 also resting on the floor support the main portion of the boiler.

Heat exchanger 9 is heated by a coil within the same by means of pipe 10 and return pipe 11 from the boiler. Pipe 12 from the heat exchanger leads into hot water tank 13 and returns by pipe 14 to the heat exchanger.

Under portion 1 of the boiler is an internal combustion engine 15 such as a diesel engine held on supports 16. Shaft 17 of engine is coupled to rotor 18 of a hysteresis coupling held within space 19 which is isolated from the water containing portion of the boiler by hysteresis ring 20. Conducting fins 21 extend from ring 20 into the water contained in the boiler in order to increase the conduction of heat from the coupling into the water.

Exhaust pipe 22 from engine 15 pass through a muffler 23 and out from the end 22' of the pipe. The muffler is surrounded by a jacket 23'. Water for the boiler enters through pipe 24, flows past valve 25 and into the boiler. Circulation is obtained through pipe 26 from the bottom of the boiler the water passing through pump 27 connected to engine 15 then through pipe 28 through the jacket of the engine as shown at 29 and then out of the engine through pipe 30 and through jacket 23. The water then returns to the boiler through pipe 31. By this circulation most of the heat generated in the engine is recovered and returned to the system thereby greatly increasing the efficiency thereof.

On shaft 17 between engine 15 and rotor 18 are sprockets 32 carrying chains 33 and passing over sprockets 34 on the shaft of a generator 35 thereby a source of electricity is provided which normally is not used and therefore the energy consumed therein is negligible. However if there should be a power failure in the building in which the system is installed the generator may be electrically connected to the wiring and thus furnish emergency power.

While, in explaining the operation of this invention, direct reference was made to the use of a diesel engine to burn fuel oil as a means of efficiently converting the chemical energy of a fuel into heat, the scope of the invention is in no way limited to that fuel. It could be No. 2 or "bunker C" or any other fuel. Further, the engine, instead of being a diesel, could be a gasoline engine burning gasoline or propane or other gas.

Further, the means described above for converting the mechanical output of the engine into heat was a hysteresis coupling. The above concept of a heating or steam generation plant had to do with converting the potential energy of a fuel oil into heat efficiently. This in no way should limit the scope of this invention, since other sources of potential energy may be used directly to make hot water and/or steam.

As an example, the rotor or flux generator (which could be made of permanent magnets) of the hysteresis coupling or its equivalent may be coupled to the output shaft of a windmill or the output shaft of a water wheel and the hysteresis ring of the coupling, as before, made an integral part of a boiler. In this case, the potential energy of the wind or water will be directly converted to steam. In outlying industrial areas, where steam is a prerequisite in processing and manufacture of textiles, food processing, canning, etc., the use of this device could provide a very cheap way of making steam. Indeed, the only cost is the capital investment, since the source of potential energy used (wind or waterfall) is there for the taking.

These and other variations in the details of the system may be made in accordance with the invention, which is to be broadly construed and to be limited only by the character of the claims appended hereto.

I claim:

1. A heating system comprising an internal combustion engine, a boiler for water to be heated, a hysteresis coupling in said boiler having a rotor and a hysteresis ring, means connecting said engine to said rotor, means for fixing said ring inside of said boiler and holding said ring stationary and for immersing said ring in said water, and means for sealing said rotor off from said water.

2. A heating system according to claim 1 characterized in that shafts on said engine and rotor are in alinement, said shafts being directly coupled.

3. A heating system according to claim 2 wherein said engine is a fuel fired turbine.

4. A heating system according to claim 1 characterized in that said boiler has a vertical portion in which said hysteresis coupling is located.

5. A heating system according to claim 4 characterized in that said boiler has a horizontal portion below which said engine is located.

6. A heating system according to claim 1 characterized in that said engine is water-jacketed, a connection for flow of water is provided between said engine and said boiler.

7. A heating system according to claim 6 characterized in that said engine is provided with a water-jacketed exhaust pipe, a connection between said engine jacket and said exhaust pipe jacket, and a connection between said exhaust pipe jacket and said boiler.

8. A heating system according to claim 5 characterized in that said engine is water-jacketed, a connection for flow of water is provided between said engine and said boiler, means for circulating said water from said vertical portion through said jacket and into said horizontal position.

References Cited by the Examiner

UNITED STATES PATENTS

| | | | |
|---|---|---|---|
| 1,768,716 | 7/30 | Shishkoff | 122—26 |
| 2,090,873 | 8/37 | Lazarus | 126—247 |
| 2,625,929 | 1/53 | Love et al. | 126—247 |
| 2,526,842 | 10/50 | Bessiere et al. | 172—285 |

FOREIGN PATENTS

| | | |
|---|---|---|
| 153,491 | 5/52 | Australia. |
| 758,693 | 10/56 | Great Britain. |

PERCY L. PATRICK, *Primary Examiner.*

ALDEN D. STEWART, MILTON O. HIRSHFIELD, ROBERT A. O'LEARY, *Examiners.*